(12) United States Patent
Gupta et al.

(10) Patent No.: US 8,381,121 B2
(45) Date of Patent: Feb. 19, 2013

(54) CONTROLLING SCROLL SPEED TO IMPROVE READABILITY

(75) Inventors: Gitika Gupta, Bellevue, WA (US); Benjamin C. Chamberlain, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 451 days.

(21) Appl. No.: 11/276,478

(22) Filed: Mar. 1, 2006

(65) Prior Publication Data

US 2007/0209017 A1    Sep. 6, 2007

(51) Int. Cl.
*G06F 3/048* (2006.01)
(52) U.S. Cl. .......... 715/784; 715/785; 715/787
(58) Field of Classification Search .......... 715/784–787; 345/163, 157
See application file for complete search history.

(56) References Cited

U.S. PATENT DOCUMENTS

| | | | | |
|---|---|---|---|---|
| 5,040,131 A * | 8/1991 | Torres | ........................... | 715/810 |
| 5,075,673 A * | 12/1991 | Yanker | ........................... | 345/163 |
| 5,339,391 A * | 8/1994 | Wroblewski et al. | ......... | 345/607 |
| 5,495,566 A * | 2/1996 | Kwatinetz | .................... | 715/785 |
| 5,781,785 A * | 7/1998 | Rowe et al. | .................... | 715/234 |
| 5,860,074 A * | 1/1999 | Rowe et al. | .................... | 715/235 |
| 5,864,330 A * | 1/1999 | Haynes | ........................ | 715/856 |
| 6,211,879 B1 * | 4/2001 | Soohoo | ........................ | 715/854 |
| 6,259,432 B1 * | 7/2001 | Yamada et al. | ............... | 345/159 |
| 6,337,694 B1 * | 1/2002 | Becker et al. | ................ | 345/684 |
| 6,339,437 B1 * | 1/2002 | Nielsen | ........................ | 715/787 |
| 6,721,953 B1 * | 4/2004 | Bates et al. | ...................... | 725/39 |
| 7,013,128 B2 * | 3/2006 | Ozeki et al. | ................... | 455/411 |
| 7,173,637 B1 * | 2/2007 | Hinckley et al. | .............. | 345/684 |
| 7,274,377 B2 * | 9/2007 | Ivashin et al. | ................. | 345/619 |
| 7,716,597 B2 * | 5/2010 | Plow et al. | .................... | 715/784 |
| 2002/0135602 A1 * | 9/2002 | Davis et al. | ................... | 345/684 |
| 2002/0186252 A1 * | 12/2002 | Himmel et al. | ............... | 345/787 |
| 2003/0074635 A1 * | 4/2003 | Cao | ............................. | 715/513 |
| 2003/0142137 A1 * | 7/2003 | Brown et al. | ................. | 345/786 |
| 2003/0169280 A1 * | 9/2003 | Hsieh | ............................ | 345/684 |
| 2005/0246619 A1 * | 11/2005 | Krause | .......................... | 715/500 |
| 2006/0075358 A1 * | 4/2006 | Ahokas | ......................... | 715/784 |

* cited by examiner

*Primary Examiner* — Phenuel Salomon

(57) ABSTRACT

A scrolling speed controlling system including a personal computer, a human interface device, an executable application, and a scroll speed adapter component. A user choosing to scroll an application window quickly may experience reduced readability of the information in the window because the speed at which the window is scrolling is too great to allow the user to identify or comprehend the information in the application window. A scroll speed adapter component make use of predetermined areas of interest to the user to control the scroll speed in such a way as to slow down scrolling as the area of interest approaches and speed up scrolling as the area of interest moves away.

16 Claims, 4 Drawing Sheets

CONTROLLING SCROLL SPEED TO IMPROVE READABILITY

BACKGROUND

Computer applications typically display information on a monitor or other display device. Typically only a portion of the information is visible. Viewing information in this manner is like looking through a window; there is more information outside the window but any information outside the window is not visible.

A user can move a window about in order to view different information. However, it may be easy to pass or skip over the desired information. Also, if a display is small the window is typically smaller making it easier to skip information. Reducing the size of the displayed information may result in difficulty reading what is displayed.

SUMMARY

A scrolling speed controlling system including a personal computer, a human interface device, an executable application, and a scroll speed adapter component. A user choosing to quickly scroll an application window may experience reduced readability of the information in the window because the speed at which the window is scrolling is too great to allow the user to identify or comprehend the information in the application window. A scroll speed adapter component may make use of predetermined areas of interest to the user to control the scroll speed in such a way as to slow down scrolling as the area of interest approaches and speed up scrolling as the area of interest moves away.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

Figure 1:
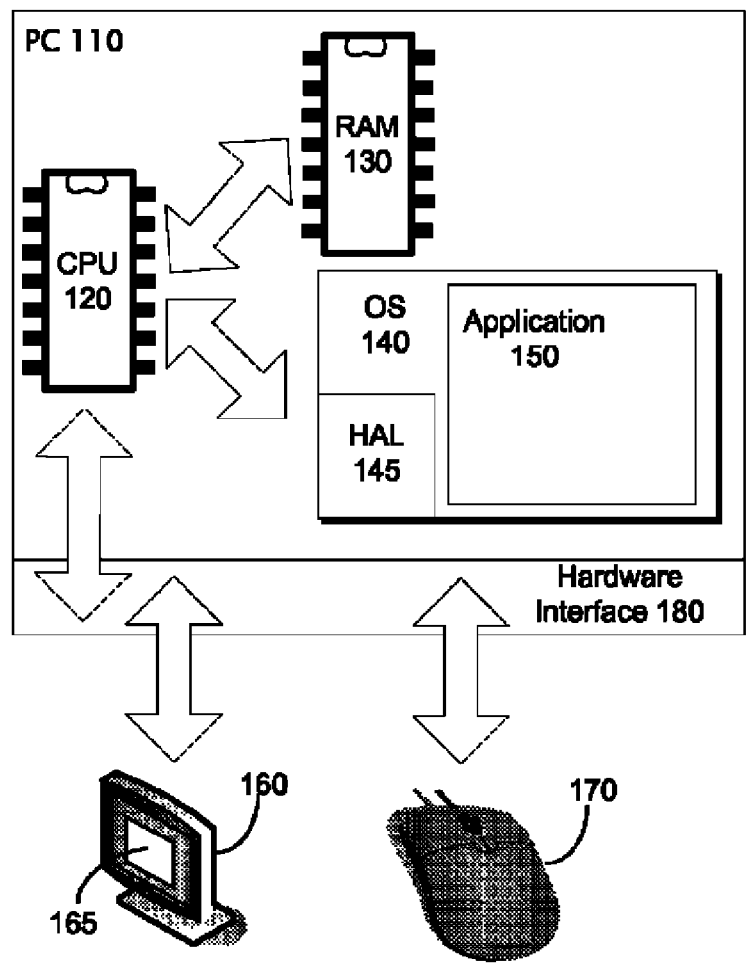
FIG. 1 is a block diagram showing a conventional PC executing an operating system, an application, and a human interface device for conventionally controlling scrolling.

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Although the present examples are described and illustrated herein as being implemented in a Personal Computer (PC) system, the system described is provided as an example and not a limitation. As those skilled in the art will appreciate, the present examples are suitable for application in a variety of different types of systems including Personal Digital Assistants (PDAs), portable telephones, virtualizations or emulations of PCs, and the like.

This description relates generally to controlling the scrolling speed of a window within an application. In particular, if a user of an application chooses to scroll an application window very quickly they may not be able to identify the area in which they intended to scroll. For example, if a user of a spreadsheet application wishes to select a number of cells in a spreadsheet, the user may select a first cell and then drag the control pointer down and beyond the border of the spreadsheet application window. As scrolling speed increases, the number of cells scrolling past the viewable area of the spreadsheet application window increases and the user may not be able to physically see the end of the range of cells the user wishes to select and accidentally go beyond the end of the range of cells. A typical application may be controlling the scrolling of windows in a spreadsheet application, a word processing application, an image editing application, or the like.

The example described below may typically allow scrolling speed to be adjusted so that it is easier to navigate through a document without skipping the spot a user may want to stop at. A conventional application executing in an operating system may have a document or child window associated with it that extends beyond the visible borders of the application window. An example of such a document or child window may be a spreadsheet document associated with a spreadsheet application. A user may scroll, or move, the non-visible area of a document or child window to a visible area of the conventional application window by manipulating the scroll control associated with the document or child window. The user may use their computer mouse to click on a scroll bar or may move the scroll wheel on their computer mouse if one is available, for example.

Manipulating the scroll control or scrolling may typically move a predetermined area of the non-visible document or child window into the visible area of the conventional application window. Clicking on an up or down arrow associated with the scroll control may move the next line in the non-visible area of the document or child window into the visible area of the conventional application window, for example. Other equivalent methods of scrolling may also be employed.

A user of the application may wish to scroll to another location in the non-visible portion of the document or child window more quickly than is possible using the scroll control. The user may indicate their desire to scroll quickly by moving the pointer associated with a computer mouse either outside of the border of the application window or outside of the document or child window's border within the application window. The conventional application may then move a larger non-visible area of the document or child window into the visible area in the same amount of time as is used to scroll one line using the scroll control.

Scrolling quickly in this manner may allow a user to quickly view a previously non-visible area of the document or child window, however, the user may miss the exact portion of the non-visible area they are interested in. That is, the user may not be able to physically recognize the exact portion of the non-visible area they are interested in because the document or child window is moving too quickly.

A scrolling software component which interacts with the application may be useful in identifying typical areas of the document or child window in which the user may be interested. The scrolling software component may then slow the scrolling rate of the document or child window as the identified area draws near to a border of the application window. Slowing scrolling in the manner may grant the user greater visibility of the identified area and may further allow the user to stop scrolling at the identified area. If the user chooses not to stop scrolling, the scrolling component may gradually increase the scrolling speed until it reaches the maximum scrolling speed.

FIG. 1 is a block diagram showing a conventional PC 110 executing a conventional operating system 140, a conventional application 150, and a conventional human interface device (HID) 170 for controlling the conventional application 150. The PC 110 is a conventionally constructed Personal Computer or its equivalent configured to display images on a conventional monitor 160 and accept user input from a conventional human interface device 170. The monitor 160 may display a scrolling window 165 that displays a portion of the information being processed by the application 150. An example of a conventional human interface device 170 may be a computer mouse, a computer trackball, a touch pad, a computer keyboard, or the like that may be used to control scrolling in the scrolling window 165.

The PC 110 typically includes a conventional central processing unit (CPU) 120, a conventional random access memory (RAM) 130, and a conventional hardware interface 180. The conventional hardware interface 180 may be a Peripheral Component Interconnect (PCI) local bus, a Personal Computer Memory Card International Association (PCMCIA) slot, an Accelerated Graphics Port (AGP), or the like.

The PC 110 may typically execute a conventional Operating System (OS) 140. The conventional OS 140 may provide a conventional hardware abstraction layer 145. The conventional hardware abstraction layer 145 may include an application programmer interface (API) through which a conventional application 150 may communicate with hardware devices such as the monitor 160 or a human interface device 170 connected to the conventional hardware interface 180. A hardware abstraction layer 145 may provide developers of applications with a consistent API through which they may receive and send information from a variety of hardware devices connected to the hardware interface 180.

For example, the conventional OS 140 may receive information from the conventional hardware interface 180 indicating that a user of the PC 110 has clicked a button on a conventional human interface device 170 such as a computer mouse. The OS 140 may then dispatch information related to the button click, such as screen location, to the conventional application 150. The conventional application 150 may then act in accordance with the received information.

The conventional OS 140 may further receive instructions from the conventional application 150 related to display of the conventional application 150 on the monitor 160. For example, the conventional application 150 may instruct the conventional OS 140 to display the visible portion of a child window. The conventional application 150 may also include a non-visible portion of a child window which may be held in conventional RAM 130.

A user of the conventional application 150 may wish to view information in the non-visible portion of the child window, and therefore may use the conventional human interface device 160 to interact with a scroll control associated with the child window.

The rate at which the non-visible portion of the child window enters the visible area of the conventional application 150 is also known as a scroll speed. The non-visible portion of the child window may be very large and a user may wish to increase the scroll speed of the child window to quickly move to an area of interest in the non-visible portion of the child window. The user may indicate their desire to scroll quickly in a number of ways.

As the scroll speed of the non-visible portion of the child window increases, the readability of the information included in the child window may be reduced. For example, the non-visible portion of the child window may scroll into the visible area of the conventional application 150 too quickly for the user to recognize an area of interest or comprehend the information included in the child window.

There may be areas included in the non-visible portion of the child window which are commonly of interest to a user of the conventional application 150. For example, if the conventional application 150 is a spreadsheet application, a large set of numerical data may be included in the child window. The end of a column of numerical data may be of interest to most users because a common operation a user may undertake in a spreadsheet application may be adding data to the end of a column.

Once these areas of interest are identified, a conventional application 150 may adjust the scroll speed up or down as these areas of interest move from the non-visible area to the visible area. Such identifying of areas of interest and adjusting of the scroll speed may be accomplished in various ways. One such way may be a scrolling method.

Figure 2:
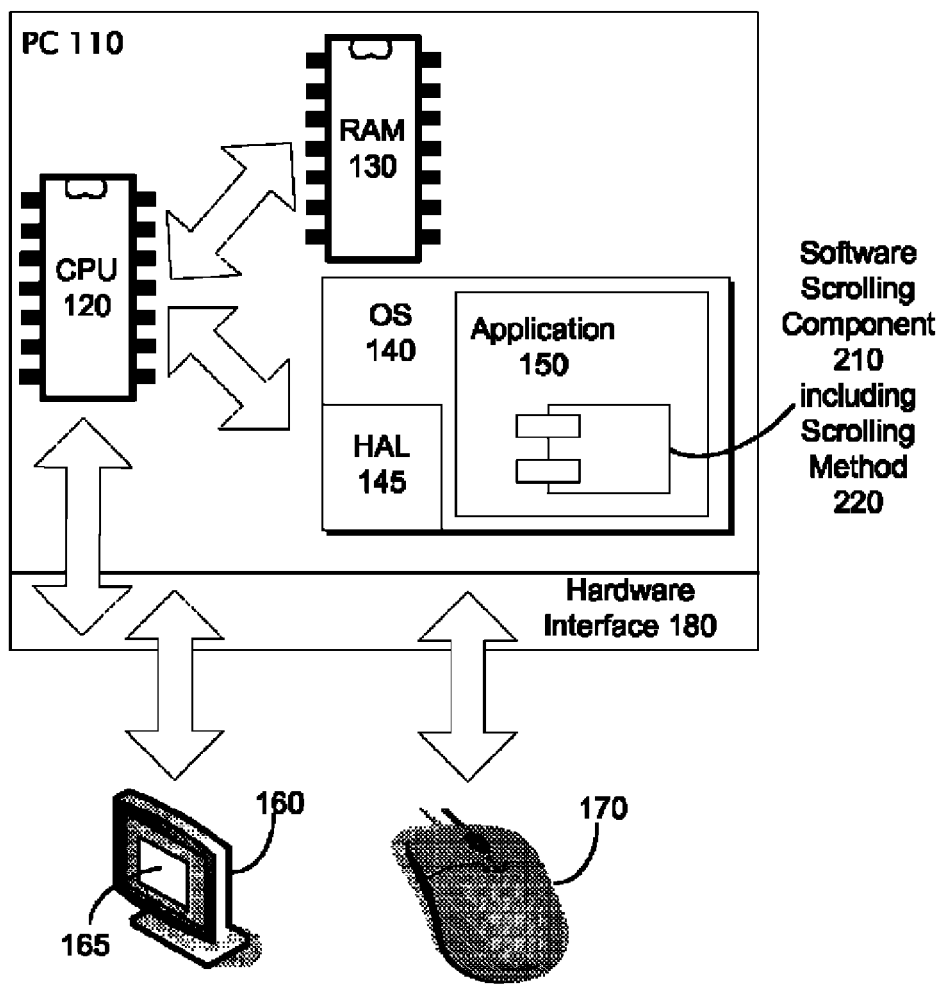
FIG. 2 is a block diagram showing a PC executing an operating system, an application, a human interface device for controlling the application, and an example of a scrolling component for adapting the scrolling speed of application windows.

FIG. 2 is a block diagram showing a PC 110 executing an operating system 140, an application 150, a human interface device 170 for controlling the application, and an example of a scrolling component 210 for adapting the scrolling speed of windows associated with the application 150. Such an example scrolling component 210 may implement a scrolling method 220 in order to adjust the scrolling speed of a child window associated with the application 150.

Such an example scrolling component 210 may prevent a user scrolling past a desired stopping point. The example scrolling component 210 may also slow down or speed up the rate of scrolling as distance between predetermined areas of interest to a user of an application and a viewable area of the application 150 are determined to be within a predetermined range.

The components having like numbering from the previous figure function similarly, and the reader is directed to the previous figure for a description of their operation. A description of the newly introduced components is provided below.

The scrolling component 210 may be an actual software component such as a component which conforms to the Microsoft Component Object Model (COM) standard or a component intended for use with a runtime environment such as Sun Java™ or Microsoft .Net Frameworks. However, the scrolling component 210 may also be a class or a member of class compiled in line with the computer code used to create the application 150.

As previously discussed, a user of the application 150 may wish to quickly scroll to a non-visible area of a child window associated with the application 150. The scrolling component 210 and the scrolling method 220 implemented by the scrolling component 210 may improve the readability of the information included on a child window associated with the application 150 in a variety of ways.

In order to more clearly understand the techniques used to increase readability of a quickly scrolling child window associated with an application 150, a description of the elements of a typical child window will be provided. Also, the reasons for reduced readability of quickly scrolling information will be discussed in greater detail.

Figure 3:
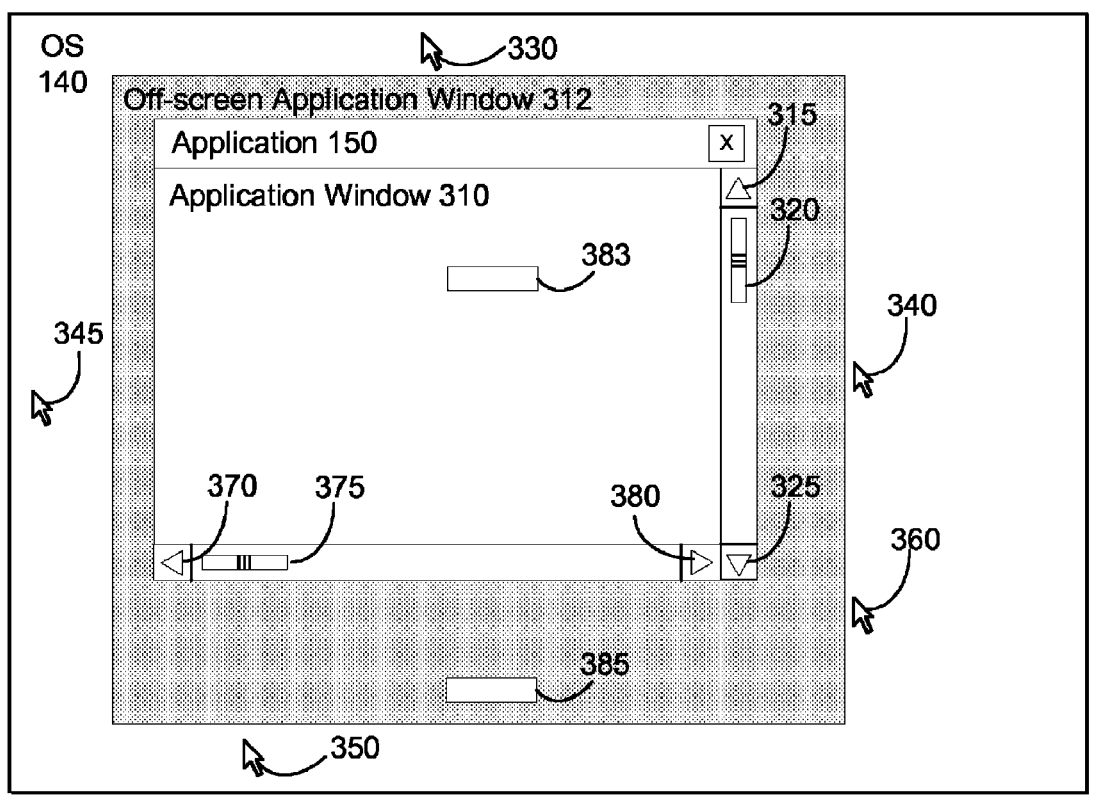
FIG. 3 is a diagram of a scrolling window generated by an operating system to a display that provides controlled scrolling.

FIG. 3 is a diagram of a scrolling window 165 generated by a software scrolling component 210 to generate a display that provides controlled scrolling. Operating system 140 (from FIG. 2) and application 150 (from FIG. 2), and the user interface associated with each work in conjunction with the software scrolling component 210 to produce controlled scrolling. The application further includes an application window 310, and the application window 310 further includes an off-screen application window 312 which represents the non-visible area of the application window 310. The application window 310 further includes an up-down scroll control comprised of an up-scroll arrow 315, a down-scroll arrow 325, and an up-down scroll bar 320, as well as a right-left scroll control comprised of a left-scroll arrow 370, a right-scroll arrow 380, and an right-left scroll bar 375.

The pointers 330, 340, 345, 350, and 360 represent mutually exclusive instantiations of a control pointer within the operating system 140. That is, each instance of the pointers 330, 340, 350, and 360 do not co-exist in the operating system 140, rather, the pointers 330, 340, 350, and 360 represent distinct operations selected by a user of the operating system 140 separated by time.

The pointers 330, 340, 350, and 360 may be controlled by a user manipulating a human interface device (HID) (from FIG. 2). Such a human interface device may be a computer mouse, a computer mouse with a scrolling wheel, a touch pad on a laptop computer, a trackball, the arrow keys of a keyboard, or the like. The scrolling component 210 may operate to control pointers so that a user tends not to jump over information by slowing down before the desired information is reached.

A user may scroll the off-screen portion of the application window 312 to the visible portion of the application window 310 in a variety of ways. A user may indicate their wish to scroll the off-screen portion of the application window 312 up a small amount by clicking on the up-scroll arrow 315. A user may indicate their wish to scroll the off-screen portion of application window 312 down a small amount by clicking on the down-scroll arrow 325. An instantaneous click of either the up-scroll arrow 315 or the down-scroll arrow 325 may result in a single movement of the off-screen portion of the application window 312 to the visible portion of the application window 310. Clicking on and holding the click down on either the up-scroll arrow 315 may result in a succession of single movements of the off-screen portion of the application window 312 into the visible portion of the application window 310.

A user may also click on the tab of the up-down scroll bar 320 and drag the scroll bar either up or down to indicate the direction in which the user wishes to scroll. The length of the scroll bar typically corresponds to the entire length of the whole application window, that is, the area represented by the application window 310 and the off-screen application window 312. For example, when the scroll tab is located at the top of the scroll bar 320, the top border of the application window 310 and off-screen application window 312 may at the same location as the top border of the application 150. Continuing the example, when the scroll tab is located at the bottom of the scroll bar 320, the bottom border of the application window 310 and the off-screen application window 312 may be at the same location as the bottom border of the application 150.

A user may also scroll the off-screen application window 312 into the application window 310 from left to right or right to left using the same method described above in conjunction with the left-scroll arrow 370, the right-scroll arrow 380, and the right-left scroll bar 375.

The user may also choose to scroll the off-screen application window 312 into the application window 310 by clicking down and selecting a portion of the information contained in the application window 310, holding the click down, and moving the control pointer in the direction they wish to scroll. Such an operation may also select multiple elements of information contained in the application window 31 and the off-screen application window 312. For example, if the application 150 is a spreadsheet application, the user may click on a single cell 383 within the application window 310, hold the click down, and move the control pointer down to select all the cells between the initial single cell 383 and the last cell in the column 385.

The operation described above may be known as "select scrolling". The user may move the control pointer either within the boundaries of the application window 310, which may result in no scrolling, or may move the control pointer to another location outside the application window 310 to begin select scrolling. For example, if the user moves the control pointer to control pointer location 350, the off-screen application window 312 may scroll up to the visible area of the application window 310. Continuing the example, if the user moves the control pointer to control pointer location 330, the off-screen application window 312 may scroll down to the visible area of the application window 310. If the user moves the control pointer to control pointer location 340, the off-screen application window 312 may scroll left into the visible area of the application window 310. If the user moves the control pointer to control pointer location 345, the off-screen application window 312 may scroll right into the visible area of the application window 310.

If the user moves the control pointer to control pointer location 360, the off-screen application window 312 may scroll up and left into the visible area of the application window 310. While no control pointer is shown for the remaining diagonal directions, it will be understood by those with skill in the art that the off-screen application window 312 will select-scroll in a manner related to the location of the control pointer.

The user may indicate the speed at which they wish to scroll the off-screen application window 312 into the visible area of the application window 310 by varying the distance away from the outside border of the application 150 at which they position the control pointer. Moving the control pointer a large distance away from the border of the application 150 may indicate a wish to scroll the off-screen application window 312 into the application window 310 at a greater rate. Move the control pointer a small distance away from the border of the application 150 may indicate a wish to scroll the off-screen application window 312 into the application window 310 at a slower rate.

The rate at which the off-screen application window 312 enters the application window 310 may be determined by a variety of methods. For example, if the application 150 is a spreadsheet, a single unit of scrolling may be moving the off-screen application window 312 into the application window 310 the length or height of a single spreadsheet cell. Scrolling speed may be increased by moving the off-screen application window 312 into the application window 310 using a larger number of single spreadsheet cells. That is, the single unit of scrolling may increase from one single spreadsheet cell per scroll operation to five, ten, twenty, or any number of single spreadsheet cells per scroll operation. Those skilled in the art will appreciate that this example can be applied to many other types of applications such as word processing applications, image editing applications, and the like.

Increasing the scroll speed may result in reduced readability of the information contained in the off-screen application window 312 as it moves into the application window 310. The reason readability is reduced may be because of the fact that a greater amount of information is present in the application window 310 during fast scrolling for the same period a smaller amount of information is present in the application window 310 during slower scrolling. A user may not be able to read, identify, or comprehend the greater amount of information present in the application window 310 within the time the information is present.

Readability may be improved by identifying logical areas a typical user of the application may be interested in viewing, and then slowing the scroll speed as the logical area approaches in such a way as to give the user the opportunity to stop scrolling at the area of interest. For example, if the application is a spreadsheet application and the user wishes to select a column of cells beginning with a first cell 383 and ending with a last cell 385, they may click on the first cell 383 and move the control pointer down outside the application window 310 to control pointer position 350. The off-screen application window 312 may then scroll rapidly into the application window 310, and as the last cell 385 approaches the bottom border of the application window 310, scrolling is slowed to allow the user to visually identify the last cell 385 and end scrolling at that point, selecting only the cells in the column they wish to select. A discussion of a method for performing this operation follows.

Figure 4:
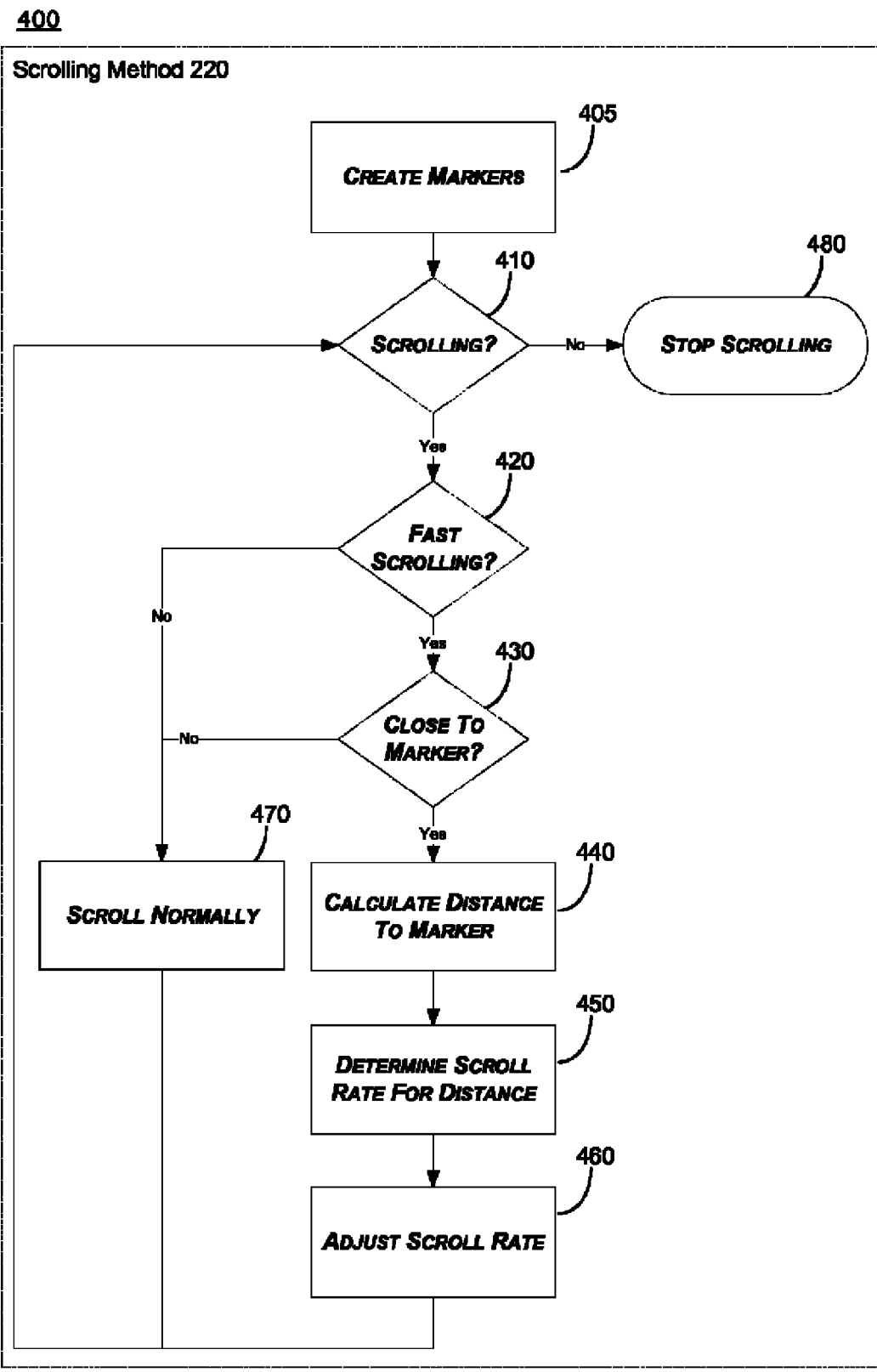
FIG. 4 is a flow diagram showing a method for adapting the scroll speed of an application window.

FIG. 4 is a flow diagram showing a method for adapting the scroll speed of an application window. As previously discussed, the scrolling method 220 (from FIG. 2) may be implemented in a scrolling component 210 (from FIG. 2). The scrolling component is typically a software component or its equivalent, but such a scrolling method 220 may be equivalently implemented in any type of consumer electronics device which includes a processor and memory. If the scrolling component 210 is executed in a PC environment with an operating system, the scrolling component 210 typically implements a standard interface expected by the operating system. Such a standard interface may allow the operating system to expose the functionality and may allow reuse of the scrolling component 210 to other components and applications which may execute in the operating system.

Block 405 may refer to an operation in which the areas of an application window may be identified as being of interest to a user of the application and markers are placed within the application window to indicate such an identification. Areas of interest may be determined by any method, and those of skill in the art will appreciate that different types of applications will have different types of data and differing methods of user interaction with such applications. The markers may be placed within the application window using any suitable method, for example, by embedding invisible data within the window or by storing a map of the application window in memory with tokens or variables indicating the areas of interest.

Block 410 may refer to a decision to determine whether or not a user is scrolling an off-screen portion of an application window into a visible portion of the application window. Such a determination may be the result of the application receiving an event from an operating system indicating a user has clicked on a scrolling control within the application, or may be the result of the user selecting an area or portion of data within an application window and dragging the control pointer to select a contiguous portion of the application window. If the result of the determination at block 410 is that the user is not scrolling, the method terminates at block 480. In response to a determination at block 410 that the user is scrolling, flow continues to block 420.

Block 420 may refer to a decision to determine whether or not the user has chosen to scroll more quickly than normal. For example, the user may indicate a wish to scroll quickly by selecting an area of data within the application window and moving the control pointer outside out of the boundaries of the application window. In another example, the user may have clicked on a scroll bar and moved the scroll bar up or down beyond the location in the scroll bar corresponding to the visible portion of a window. In response to a determination the user wishes to scroll quickly, flow continues on to block 430. In response to a determination the user does not wish to scroll quickly, flow continue on to block 470.

Block 430 may refer to a decision to determine whether or not the an area marked or identified as being of interest to the user at block 405 is near a boundary of the visible area of the application window. Nearness of the marker to the boundary of the visible area of the application window may be the distance between the marker and a boundary of the window may be any distance suitable for the application. In response to a positive determination that a marker is within a chosen nearness, flow continues to block 440. In response to a negative determination that a marker is not within a chosen nearness, flow continues to block 470.

Block 470 may refer to an operation in which the current scrolling speed at block 420 or 430 is maintained. Flow continues from block 470 to block 410.

Block 440 may refer to an operation in which the actual distance from the boundary of the application window to the nearby marker identified at block 430 is determined. Such a distance may be measured by any quantity. For example, the distance may measure in pixels, inches, number of cells in a spreadsheet applications, number of words or lines in word processing application, or the like. The distance may be expressed as a positive value if the boundary of the application window precedes the nearby marker or may be a negative value if the marker has entered the visible area of the application window. Flow continues to block 450.

Block 450 may refer to an operation in which the distance calculated at block 440 is used to calculate an appropriate scroll rate. Such a scroll rate may be calculated using any method. For example, a table may store a list of distances and the scroll rates corresponding to the distances. In an alternative example, the distance may be used as an input to an algorithm which returns a scroll rate corresponding to the distance.

The scroll rate may be different for the same value in a positive or negative direction. That is, scrolling may be slowed at a greater rate as the boundary of the application window approaches the marker and then scrolling may be slowed at a lesser rate as the marker enters the visible area of the application window. The effect of such an operation may be that the identified area slows down as it approaches the visible area of the application window, and then speeds up as it moves beyond the visible area of the application window. Flow continues to block 460.

Block 460 may refer to an operation in which the scroll speed is adjusted by the scroll rate calculated at block 450. Flow continues to block 410.

Methods and procedures for controlling scroll speed to improve readability are disclosed. Those skilled in the art will realize that storage devices utilized to store program instructions can be distributed across a network. For example, a remote computer may store an example of the process described as software. A local or terminal computer may access the remote computer and download a part or all of the software to run the program.

Alternatively, the local computer may download pieces of the software as needed, or may distributively process by executing some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

The invention claimed is:

1. A method of automatically regulating scroll speed of a window during a select-scroll operation, the method comprising:
    allowing a user to perform the select-scroll operation to extend a selection of a portion of a document while also scrolling the document in the window by dragging a pointer outside the window, wherein the select-scroll operation allows the user to manually vary the speed of scrolling while varying the extent of the selected portion by the select-scroll operation while still dragging the pointer, and during the dragging the scroll speed is set according to a distance of the pointer from the window;
    automatically analyzing content of the document to automatically identify a feature of the content of the document;
    select-scrolling the document in the window according to the scroll-select operation; and
    during the select-scroll operation, while the feature is not displayed in the window and while the feature is being moved toward the window by the select-scroll operation, automatically overriding the scroll speed set according to the distance of the pointer from the window by reducing the scroll speed based on a distance of the automatically identified feature relative to the window, wherein the reducing the scroll speed comprises automatically reducing the scroll speed as the feature of the content approaches the window, and wherein the overriding further comprises automatically increasing the speed of the scrolling when the feature of the content is scrolled away from the window by the user input.

2. The method of claim 1, wherein the distance is calculated according to the feature and at least one boundary area of the window.

3. The method of claim 1, wherein the document comprises a spreadsheet that contains data, the portion of the document being selected comprises a portion of a row of cells or a column of cells of the spreadsheet, and the automatically analyzing comprises identifying where the row or column transitions from having cells containing data to having cells containing no data.

4. The method of claim 1, wherein the reducing comprises computing a scroll speed according to a table that includes scroll speed values and respectively associated distances.

5. The method of claim 1, wherein the method is performed by a spreadsheet application.

6. The method of claim 1, wherein the method is performed by a word processing application.

7. The method of claim 1, wherein the distance is measured from an edge part of the window and the reducing comprises obtaining a scroll speed value from a table that correlates distances and scrolling speeds.

8. The method of claim 1, further comprising calculating a location of the feature when the user begins the select-scroll operation.

9. The method of claim 1, wherein the scroll speed is reduced proportional to the distance.

10. The method according to claim 1, wherein the scroll speed is set by monitoring the distance of the feature from the window.

11. A computer-implemented process comprising:
    displaying a document in a window, where the document is larger than the window and comprises content not displayed in the window but scrollable into the window to be displayed;
    varying a scroll speed of the document in the window while select-scrolling the document in response to a continuous user drag input dragging a pointer outside the window, where the varying is based on a changing pointer-distance comprising a distance of the pointer from the window during the dragging; and
    while select-scrolling the document in the window according to the same drag input dragging the pointer outside of the window, automatically overriding the pointer-distance-based scroll speed with an automatically determined scroll speed, wherein the overriding is responsive to automatically detecting that a feature of the content not displayed in the window is within a threshold distance of the window, the feature having been automatically located by analyzing content of the document, wherein the overriding comprises automatically reducing the scroll speed as the feature of the content approaches the window, and automatically increasing the speed of the scrolling when the feature of the content is scrolled away from the window by the user input.

12. The computer-implemented process according to claim 11, the scroll-select operation comprising an operation that allows the user to scroll the window to continue selecting content of the document that the scrolling brings into the window.

13. The computer-implemented process according to claim 12, wherein dragging the pointer beyond a border of the window triggers automatic select-scrolling.

14. The computer-implemented process according to claim 11, wherein the automatic reducing of the scroll speed is responsive to a determination the feature is within a threshold distance from the window.

15. The computer-implemented process according to claim 14, wherein the automatic reducing of the scroll speed causes the window to scroll slower when the feature is within the threshold distance from the window.

16. The computer-implemented process according to claim 11, wherein the feature is automatically identified by searching the document for an area where data content is displayed next to whitespace or empty content of the document.

* * * * *